United States Patent

Davis

(10) Patent No.: US 9,524,383 B2
(45) Date of Patent: Dec. 20, 2016

(54) DIRECTIONAL SENSING MECHANISM AND COMMUNICATIONS AUTHENTICATION

(71) Applicant: Assa Abloy AB, Stockholm (SE)

(72) Inventor: Michael Lawrence Davis, Amherst, NY (US)

(73) Assignee: ASSA ABLOY AB (SE)

( * ) Notice: Subject to any disclaimer, the term of this patent is extended or adjusted under 35 U.S.C. 154(b) by 0 days.

(21) Appl. No.: 14/148,329

(22) Filed: Jan. 6, 2014

(65) Prior Publication Data

US 2014/0118147 A1 May 1, 2014

Related U.S. Application Data

(63) Continuation of application No. 13/867,634, filed on Apr. 22, 2013, which is a continuation-in-part of
(Continued)

(51) Int. Cl.
*G08B 13/14* (2006.01)
*G06F 21/35* (2013.01)
(Continued)

(52) U.S. Cl.
CPC ............. *G06F 21/35* (2013.01); *G06F 1/1626* (2013.01); *G06F 1/1684* (2013.01); *G06F 1/1698* (2013.01); *G06F 3/0346* (2013.01); *G06F 21/31* (2013.01); *G06F 21/36* (2013.01); *G06K 7/10267* (2013.01); *G06K 19/0716* (2013.01); *G06K 19/07336* (2013.01); *G06K 19/07345* (2013.01); *H04M 1/72519* (2013.01); *G06F 2200/1637* (2013.01); *H04M 1/67* (2013.01); *H04M 1/7253* (2013.01); *H04M 2250/12* (2013.01)

(58) Field of Classification Search
CPC ............................... G06F 21/35; G06F 1/1626
USPC ....................................................... 340/572.1
See application file for complete search history.

(56) References Cited

U.S. PATENT DOCUMENTS 6,721,738 B2 * 4/2004 Verplaetse et al. ........... 700/237
6,891,475 B2    5/2005 Bui et al.
(Continued)

FOREIGN PATENT DOCUMENTS

DE          10248389        8/2004
EP          1607723         12/2005
(Continued)

OTHER PUBLICATIONS

Official Action with English Translation for Korea Patent Application No. 10-2011-7005331, mailed Oct. 13, 2014 12 pages.
(Continued)

*Primary Examiner* — Kerri McNally
(74) *Attorney, Agent, or Firm* — Sheridan Ross P.C.

(57) ABSTRACT

The present invention is directed toward an RFID device that includes a motion sensing mechanism. The motion sensing mechanism is adapted to sense motion of the RFID device and then selectively allow or restrict the RFID device's ability to transmit messages, which may include sensitive data, when the RFID device is placed in an RF field. Thus, the motion sensing mechanism is utilized to control access to data on the RFID device to only instances when the holder of the RFID device moves the RFID device in a predefined sequence of motion(s).

21 Claims, 3 Drawing Sheets

500

| Movement 1 | Movement 2 | Movement 3 | Action |
|---|---|---|---|
| ↓ | ← | ↓ | Allow Data To Be Read |
| ↑ | ↷90 |  | Allow Data To Be Read |
| ↶90 |  |  | Allow Data To Be Read |
| ↷90 X-axis | ↷180 Y-axis | ↷180 Z-axis | Transmit Canned Message #1 of N |
| ↑ | → | ↑ | Provide Sequence As Password |

Related U.S. Application Data application No. 13/179,198, filed on Jul. 8, 2011, now Pat. No. 8,427,320, which is a continuation of application No. 12/538,656, filed on Aug. 10, 2009, now Pat. No. 8,232,879.

(60) Provisional application No. 61/087,633, filed on Aug. 8, 2008.

(51) Int. Cl.

| | |
|---|---|
| *G06K 7/10* | (2006.01) |
| *G06F 1/16* | (2006.01) |
| *G06F 21/31* | (2013.01) |
| *G06F 21/36* | (2013.01) |
| *G06K 19/07* | (2006.01) |
| *G06K 19/073* | (2006.01) |
| *H04M 1/725* | (2006.01) |
| *G06F 3/0346* | (2013.01) |
| *H04M 1/67* | (2006.01) |

(56) References Cited

U.S. PATENT DOCUMENTS

| | | | |
|---|---|---|---|
| 7,084,769 | B2 | 8/2006 | Bauer et al. |
| 7,151,455 | B2 | 12/2006 | Lindsay et al. |
| 7,453,363 | B2 | 11/2008 | Reynolds |
| 7,724,705 | B2 | 5/2010 | Erola et al. |
| 7,956,725 | B2 | 6/2011 | Smith |
| 7,986,917 | B2 | 7/2011 | Ahlgren et al. |
| 8,232,879 | B2 | 7/2012 | Davis |
| 8,427,320 | B2 | 4/2013 | Davis |
| 8,488,900 | B2 | 7/2013 | Conwell |
| 8,638,190 | B1 | 1/2014 | Want et al. |
| 2003/0132301 | A1* | 7/2003 | Selker ............................ 235/487 |
| 2005/0079896 | A1* | 4/2005 | Kokko et al. .................. 455/566 |
| 2005/0189426 | A1 | 9/2005 | Nishizawa et al. |
| 2005/0212750 | A1* | 9/2005 | Marvit et al. .................. 345/156 |
| 2005/0253683 | A1 | 11/2005 | Lowe |
| 2006/0005156 | A1 | 1/2006 | Korpipaa et al. |
| 2006/0256074 | A1* | 11/2006 | Krum et al. .................... 345/156 |
| 2007/0180174 | A1* | 8/2007 | Moosavi ........................ 710/106 |
| 2008/0039212 | A1* | 2/2008 | Ahlgren et al. ................ 463/46 |
| 2008/0172733 | A1* | 7/2008 | Coriaty .................... G06F 21/32 726/19 |
| 2008/0211622 | A1 | 9/2008 | Rindtorff et al. |
| 2008/0268931 | A1* | 10/2008 | Alderucci et al. .............. 463/11 |
| 2009/0066476 | A1* | 3/2009 | Raheman ........... G07C 9/00103 340/5.64 |
| 2010/0042954 | A1 | 2/2010 | Rosenblatt et al. |
| 2010/0207730 | A1 | 8/2010 | Boursier et al. |
| 2012/0161941 | A1 | 6/2012 | Park et al. |
| 2013/0234836 | A1 | 9/2013 | Davis |

FOREIGN PATENT DOCUMENTS

| | | |
|---|---|---|
| EP | 2031548 | 3/2009 |
| JP | 2001-524904 | 12/2001 |
| JP | 2002-291047 | 10/2002 |
| JP | 2007-025957 | 2/2007 |
| JP | 2007-316981 | 12/2007 |
| JP | 2007-329815 | 12/2007 |
| JP | 2008-154004 | 7/2008 |
| KR | 100651268 | 11/2006 |
| WO | WO 98/45147 | 10/1998 |
| WO | WO 2008/007175 | 1/2008 |
| WO | WO 2008/029461 | 3/2008 |
| WO | WO 2009/027209 | 3/2009 |
| WO | WO 2009/0147094 | 12/2009 |

OTHER PUBLICATIONS

Official Action (with English translation) for China Patent Application No. 200980139812.1, dated Apr. 15, 2014, 19 pages.
Official Action with English Translation for Japan Patent Application No. 2013-168130, dated Dec. 3, 2013 6 pages.
Nmarquardt, "RFID Reader Detector and Tilt-Sensitive RFID Tag", available at http://www.instructables.com/id/RFID_Reader_Detector and_Tilt_Sensitive_RFID_Tag/, Oct. 30, 2008, 15 pages.
International Search Report for International (PCT) Application No. PCT/US2009/053293, mailed Oct. 1, 2009.
Written Opinion for International (PCT) Application No. PCT/US2009/053293, mailed Oct. 1, 2009.
International Preliminary Report on Patentability for International (PCT) Patent Application No. PCT/US2009/053293, mailed Feb. 17, 2011.
Official Action for Canada Patent Application No. 2,733,522, mailed Jul. 9, 2012 2 pages.
Notice of Allowance for Canada Patent Application No. 2,733,522, mailed Apr. 24, 2013 1 page.
Official Action with English translation for China Patent Application No. 200980139812.1, dated Jan. 7, 2013 14 pages.
Official Action (with English translation) for China Patent Application No. 200980139812.1, dated Sep. 23, 2013, 19 pages.
Extended Search Report for European Patent Application No. 09805661.7, dated Jun. 28, 2012 6 pages.
Intention to Grant Patent for European Patent Application No. 09805661.7, dated Mar. 22, 2013 31 pages.
English Translation of Official Action for Japan Patent Application No. 2011-522307, mailed Feb. 26, 2013 5 pages.
Official Action with English Translation for Japan Patent Application No. 2011-522307, mailed Dec. 3, 2013 9 pages.
Official Action for U.S. Appl. No. 12/538,656, mailed Nov. 2, 2011 28 pages.
Official Action for U.S. Appl. No. 13/179,198, mailed Nov. 7, 2011 20 pages.
Notice of Allowance for U.S. Appl. No. 12/538,656, mailed Feb. 28, 2012 10 pages.
Official Action for U.S. Appl. No. 13/179,198, mailed May 9, 2012 8 pages.
Notice of Allowance for U.S. Appl. No. 13/179,198, mailed Sep. 6, 2012.
Notice of Allowance for U.S. Appl. No. 13/179,198, mailed Nov. 2, 2012, 7 pages.
Official Action with English Translation for China Patent Application No. 200980139812.1, dated Dec. 29, 2014 19 pages.
Official Action with English Translation for Japan Patent Application No. 2011-522307, mailed Dec. 16, 2014 6 pages.
U.S. Appl. No. 14/644,499, filed Mar. 11, 2015, Davis et al.
Official Action with English Translation for Japan Patent Application No. 2013-168130, mailed Dec. 16, 2014 8 pages.
Official Action for U.S. Appl. No. 13/867,634, mailed Feb. 4, 2015 20 pages.
Examination Report for Australia Patent Application No. 2009279402, dated Feb. 20, 2014 4 pages.
Notice of Acceptance for Australia Patent Application No. 2009279402, mailed Aug. 13, 2015 2 pages.
Notice of Allowance with English Translation for Korea Patent Application No. 10-2011-7005331, dated Mar. 30, 2015 3 pages.
Official Action for U.S. Appl. No. 13/867,634, mailed Jun. 17, 2015 24 pages.
Notice of Allowance for U.S. Appl. No. 13/867,634, mailed Aug. 3, 2015 5 pages.

\* cited by examiner

| Movement 1 | Movement 2 | Movement 3 | Action |
|---|---|---|---|
| ↓ | ← | ↓ | Allow Data To Be Read |
| ↑ | ↷ 90 | | Allow Data To Be Read |
| ↶ 90 | | | Allow Data To Be Read |
| ↶ 90 X-axis | ↶ 180 Y-axis | ↶ 180 Z-axis | Transmit Canned Message #1 of N |
| ↑ | → | ↑ | Provide Sequence As Password |

DIRECTIONAL SENSING MECHANISM AND COMMUNICATIONS AUTHENTICATION

CROSS-REFERENCE TO RELATED APPLICATIONS

This application is a Continuation of U.S. patent application Ser. No. 13/867,634, filed Apr. 22, 2013, which is a Continuation-In-Part of U.S. application Ser. No. 13/179,198, filed Jul. 8, 2011, now U.S. Pat. No. 8,427,320, which is a Continuation of U.S. patent application Ser. No. 12/538,656, filed Aug. 10, 2009, now U.S. Pat. No. 8,232,879, which claims the benefit of U.S. Provisional Patent Application Ser. No. 61/087,633, filed Aug. 8, 2008, the entire disclosures of which are hereby incorporated herein by reference.

FIELD OF THE INVENTION

The present invention is generally directed to the detection of card movement and the utilization of said detection information in connection with controlling operation thereof.

BACKGROUND

Radio Frequency Identification (RFID) systems use an RFID reader to wirelessly detect the presence of a nearby RFID tag and read an identification code stored in the tag. The identification code in the RFID tag can be used to control access to a protected resource by allowing access only when an RFID tag having an authorized identification code is detected. Generally, the authorized RFID tag is issued to an authorized user to ensure that only the authorized user has access to the protected resource. If the authorized RFID tag is lost or stolen, however, it can be presented by an unauthorized user to access the protected resource.

Presently available installed RFID systems use a variety of different complex coding and signaling methods, some of which are proprietary. The RFID tags used with these systems take two forms—cards and key fobs. The coding that these leased programmers can embed is limited to certain specific ranges and formats allowed by each of the distributors and controlled by an encrypted media, which is supplied by each of the companies.

There are proposals to integrate RFID devices into banknotes, credit cards, debit cards, store loyalty cards and other high-value objects in an attempt to prevent fraud. The thought is that a person carrying an object with all of the authentication information must be the true object owner. As more and more objects are equipped with these RFID devices, the chances of having one's personal information stolen from them increases. High-value objects integrated with RFID devices typically carry extremely sensitive information (e.g. social security numbers, addresses, bank account numbers, ATM pin codes, names, etc.) If this type of information is stolen, the entire identity of the object holder may be compromised. This poses a very serious threat to the general population carrying objects equipped with an RFID device.

SUMMARY

It is, therefore, one aspect of the present invention to provide an RFID device that restricts data transmissions until it has been moved in a particular way by the holder of the RFID device. By requiring the holder of the device to move the RFID device in a certain way before releasing its sensitive data, the RFID device potentially limits its use, and therefore release of sensitive data, to instances where an authorized user is actually presenting the card purposefully to a reader (assuming that an unauthorized user does not know the predetermined motion sequence that unlocks the sensitive data from the RFID device). This helps minimize or completely prevent third parties from stealing data from the RFID device unless the holder of the RFID device is moving it in the predetermined sequence of motions. In other words, an attacker is restricted from illicitly passing a reader in proximity to the user's RFID device to harvest data from the user without their consent.

In accordance with at least one embodiment of the present invention, an RFID device is equipped with a directional sensing mechanism such as a Micro-Electro-Mechanical System (MEMS) or accelerometer that is capable of sensing movement of the RFID device in one or more directions and/or rotations of the RFID device in one or more rotational directions. The present invention is generally directed toward a method, apparatus, and system that utilizes a directional sensing component in combination with an RFID device to substantially prohibit illicit data harvesting from RFID devices. As can be appreciated, an RFID device can be implemented as a part of an ID/access card, smart card, RF tag, cellular phone, Personal Digital Assistant (PDA), key fob, and the like.

In accordance with one embodiment of the present invention, a system is provided that substantially prevents the illegitimate harvesting of data from an RFID device. The data may have degrees of sensitivity. For example, highly sensitive data may include, but is not limited to, bank account numbers, social security numbers, PIN codes, passwords, keys, RFID unique ID, encryption schemes, etc. Less sensitive data may include, but is not limited to, user name, manufacturer ID, job title, and so on.

MEMS are the integration of mechanical elements, sensors, actuators, and electronics on a common silicon substrate through microfabrication technology. While the electronics are fabricated using integrated circuit (IC) process sequences (e.g., CMOS, Bipolar, or BICMOS processes), the micromechanical components are fabricated using compatible "micromachining" processes that selectively etch away parts of the silicon wafer or add new structural layers to form the mechanical and electromechanical devices.

MEMS are capable of bringing together silicon-based microelectronics with micromachining technology, making possible the realization of complete systems-on-a-chip. MEMS is an enabling technology allowing the development of smart products, augmenting the computational ability of microelectronics with the perception and control capabilities of microsensors and microactuators and expanding the space of possible designs and applications.

Because MEMS devices are manufactured using batch fabrication techniques similar to those used for integrated circuits, unprecedented levels of functionality, reliability, and sophistication can be placed on a small silicon chip at a relatively low cost.

In accordance with at least some embodiments of the present invention, the MEMS device may be provided as an integral part of the processing chip that is also used to control the RF communication functionality of the RFID device. More specifically, a single chip may be responsible for executing the traditional processing of the RFID device as well as controlling whether the RFID device is allowed to respond to a request for data from a reader (or even enable the antenna to respond to any type of RF field). Unless the proper sequence of motions (e.g., rotations, sliding motions, etc.) is detected by the MEMS device the processor will not be allowed to reveal any sensitive data from its storage location on the RFID device. In accordance with at least one embodiment of the present invention, a switch (e.g., logical switch, mechanical switch, electromechanical switch, electrical switch, or the like) may be provided on the RFID device that inhibits the RFID device from responding to any energization by a reader or the like unless the predetermined motion or sequence of motions are detected at the RFID device. Thus, the RFID device is enabled to unilaterally control whether it provides any data to a requesting source based on whether the predetermined motion has been detected.

In accordance with at least some embodiments of the present invention, passwords could also be entered by a user of the RFID device by using a combination lock metaphor. For example, a password could correspond to rotating the RFID device right, then back to original position, then right, etc. Thus, while the password combination is used to enable the RFID device to transmit data to a reader, the RFID device may also send the results of the detected motion (i.e., the RFID device may send the reader the combination of right-return-right, likely as binary data). The reader may then analyze the motion information as an additional password for verifying the identity of the RFID device and the holder of the RFID device. If either the card information or the motion-based-password is not valid, then the reader may determine that the RFID device is not granted access to the asset protected by the reader. Thus, the password provided to the reader as a result of detecting motion may be used to represent something that the user knows in addition to the thing (RFID device) the user is carrying, thereby providing two layers of security.

This two layer security paradigm can be implemented with a traditional reader that does not necessarily have a keypad. If a user's card is lost or compromised, it will be unusable by another user who does not know the motion-based password.

In accordance with further embodiments of the present invention, the "motion information" captured by the directional sensing mechanism may also correspond to certain messages (e.g., a table may be provided mapping certain sequences of motion to certain messages). Accordingly, the RFID device may either send the corresponding message or the captured motion information to the reader where it is analyzed. The message may, for example, indicate that the holder of the RFID device is under duress. As can be appreciated by one skilled in the art, other sequences of motions may be mapped to different messages to provide other indicia about the holder of the RFID device. In some embodiments the table may be maintained in the RFID device. In some embodiments the table may be maintained in the reader. In some embodiments, the table may be maintained in a combination of the RFID device and the reader.

In accordance with still further embodiments of the present invention, the integration of a directional-sensing mechanism onto a chip can be leveraged in other applications, such as in mobile communication and cellular phone applications. More specifically, a SIM card or similar processing platform may be adapted to include a directional-sensing mechanism that acts as an input to the card. Thus, a user of the mobile communication device may be allowed to control the operation of the mobile communication device (e.g., make call, answer call, reject call, etc.) by simply shaking the mobile communication device or by moving the mobile communication device in a predetermined pattern of motion. In still further embodiments, a user can simply shake or tap their mobile device when they are on a call with another user or when they are busy doing something else (e.g., during a meeting). The shaking or tapping of the mobile device may cause the mobile device to generate a predetermined text message which is transmitted back to the caller, informing the caller that the intended recipient of the message is busy and will call back later. In other embodiments, a user may be allowed to locate the menu of services and applications provided on the mobile device by simply shaking or tapping the mobile device. In still other embodiments, the mobile device may be adapted to In still other embodiments a combined accelerometer and gyroscope unit is provided that generally comprises: a proof mass; primary actuating means operable to actuate the proof mass along a primary axis; secondary actuating means operable to actuate the proof mass along a secondary axis; secondary sensing means operable to sense the position of the proof mass along the secondary axis; and primary sensing means operable to sense the position of the proof mass along the primary axis wherein EA force-feedback loops are set up for both the secondary axis and the primary axis.

It is another aspect of the present invention to provide a combined accelerometer and gyroscope unit wherein the accelerometer and gyroscope unit is a MEMS accelerometer and gyroscope unit.

It is another aspect of the present invention to provide a combined accelerometer and gyroscope unit wherein both the primary actuating means and the primary sensing means are comb-drive capacitors.

It is another aspect of the present invention to provide a combined accelerometer and gyroscope unit wherein separate comb-drive capacitors are provided for actuating and for readout.

It is another aspect of the present invention to provide a combined accelerometer and gyroscope unit wherein time multiplexing is used to allow the same comb-drive capacitors to be utilised both for actuating and for readout.

It is another aspect of the present invention to provide a combined accelerometer and gyroscope unit wherein both the secondary actuating means and the secondary sensing means are differential parallel plate capacitors.

It is another aspect of the present invention to provide a combined accelerometer and gyroscope unit wherein separate differential parallel plate capacitors are provided for actuating and for readout.

It is another aspect of the present invention to provide a combined accelerometer and gyroscope unit wherein time multiplexing is used to allow the same differential parallel plate capacitors to be utilised both for actuating and for readout.

It is another aspect of the present invention to provide a combined accelerometer and gyroscope unit wherein separate ΣΔ force-feedback loops are provided for the primary mode and the secondary mode.

It is another aspect of the present invention to provide a combined accelerometer and gyroscope unit wherein the primary loop has an extra input Vjn.

It is another aspect of the present invention to provide a combined accelerometer and gyroscope unit wherein each loop incorporates an electrical filter.

It is another aspect of the present invention to provide a combined accelerometer and gyroscope unit wherein at the end of each loop, a quantizer is provided to deliver digital output values.

It is another aspect of the present invention to provide a combined accelerometer and gyroscope unit wherein each loop contains a mechanical feedback path.

It is another aspect of the present invention to provide a combined accelerometer and gyroscope unit wherein an electrical feedback path is also provided.

It is another aspect of the present invention to provide a combined accelerometer and gyroscope unit as claimed in claim 14 wherein the electrical feedback loops are provided with additional electrical filters.

It is another aspect of the present invention to provide a combined accelerometer and gyroscope unit wherein each additional filter has the same poles as the first filters.

It is another aspect of the present invention to provide a combined accelerometer and gyroscope unit wherein each additional filter has different zeros to the first filters.

It is another aspect of the present invention to provide a combined accelerometer and gyroscope unit wherein an extra controller filter is provided to stabilize the loop.

It is another aspect of the present invention to provide a combined accelerometer and gyroscope unit wherein the unit is further provided with tertiary actuating means operable to actuate the proof mass along a tertiary axis and/or tertiary sensing means operable to sense the position of the proof mass along the tertiary axis.

It is another aspect of the present invention to provide a combined accelerometer and gyroscope unit wherein the tertiary axis is substantially perpendicular to the plane containing the primary and secondary axes.

It is another aspect of the present invention to provide a combined accelerometer and gyroscope unit wherein both the tertiary actuating means and the tertiary sensing means are comb-drive capacitors.

It is another aspect of the present invention to provide a combined accelerometer and gyroscope unit wherein separate comb-drive capacitors may be provided for actuating and for readout.

It is another aspect of the present invention to provide a combined accelerometer and gyroscope unit wherein time multiplexing may be used to allow the same comb-drive capacitors to be utilised both for actuating and for readout.

It is another aspect of the present invention to provide a combined accelerometer and gyroscope unit wherein the two sets of fingers comprising the comb-drive capacitors may be of differing dimensions along the tertiary axis.

It is another aspect of the present invention to provide a combined accelerometer and gyroscope unit wherein the unit is operated in a mode wherein a ΣΔ force-feedback loop is set up for only one of the secondary axis and the primary axis.

It is another aspect of the present invention to provide a sensor cluster comprising one or more combined accelerometer and gyroscope units.

It is another aspect of the present invention to provide a sensor cluster wherein the cluster may additionally comprise one or more dedicated single axis or multi-axis accelerometers and/or one or more dedicated single axis or multi-axis gyroscopes.

It is another aspect of the present invention to provide a method of operating a combined accelerometer and gyroscope unit having a proof mass; primary actuating means operable to actuate the proof mass along a primary axis; secondary actuating means operable to actuate the proof mass along a secondary axis; secondary sensing means operable to sense the position of the proof mass along the secondary axis; and primary sensing means operable to sense the position of the proof mass along the primary axis, the method comprising the steps of: setting up ΣΔ force-feedback loops for the both the secondary axis and the primary axis to measure both a component of rotation and two components of acceleration.

These and other advantages will be apparent from the disclosure of the invention(s) contained herein. The above-described embodiments and configurations are neither complete nor exhaustive. As will be appreciated, other embodiments of the invention are possible using, alone or in combination, one or more of the features set forth above or described in detail below.

DETAILED DESCRIPTION

Figure 1:
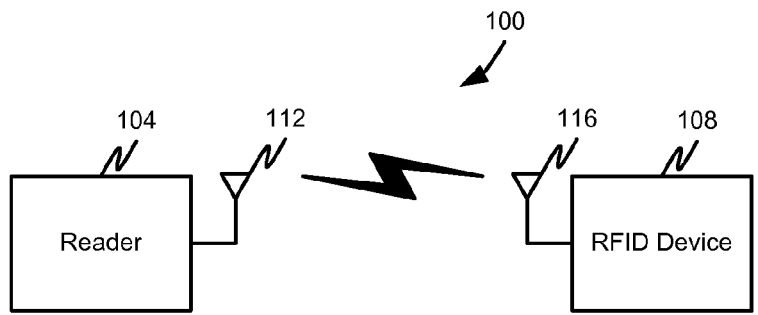
FIG. 1 is a block diagram depicting an access control system in accordance with at least some embodiments of the present invention.

Referring initially to FIG. 1, an illustrative access control system 100 is depicted in accordance with at least some embodiments of the present invention. The access control system 100 may comprise a reader 104 and an RFID device 108. The RFID 108 may be a passive device which does not require power supplied from an internal power source. The electrical power required to operate a passive tag is supplied to the tag by electromagnetic energy transmitted from the reader 104. The electromagnetic energy may be generated at an antenna 112 of the reader 104 and received at an antenna 116 of the RFID device 108. In accordance with at least some embodiments of the present invention, the antenna 116 (or the entire antenna circuit) may not be allowed to respond to the electromagnetic energy generated by the reader 104 if the RFID device 108 has not been moved in a predefined motion of predefined sequence of motions.

Accordingly, a passive RFID device 108 is operational when it receives electromagnetic waves from the reader 104 and has been moved in a predefined motion. As can be appreciated, however, the RFID device 108 may alternatively be an active device which has some form of internal power supply (e.g., a battery or a similar energy storage device). In this particular embodiment, the battery may be disconnected from the antenna or some other portion of the RFID device 108 unless the RFID device 108 has been moved in a predefined motion.

Figure 2:
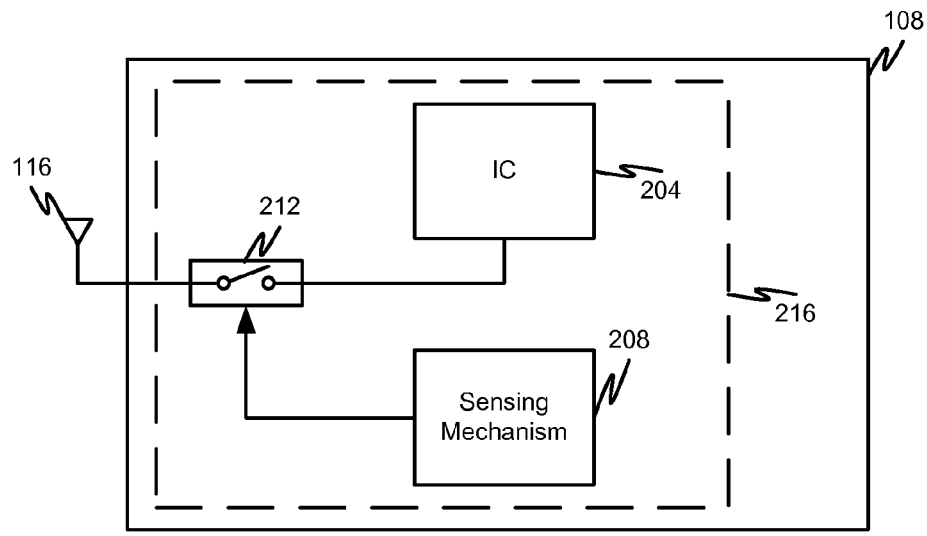
FIG. 2 is a block diagram depicting an RFID device in accordance with at least some embodiments of the present invention.

Referring now to FIG. 2, the RFID device 108 may comprise a number of functional elements including an integrated circuit (IC) 204 that is connected to the device's antenna 116. The IC 204 embodies the processing and memory capabilities of the RFID device 108. The RFID device's antenna 116 is typically coupled to the IC 204 and may be a conventional coil termed a "dual-function antenna coil" which is capable of performing both the receiving and transmitting functions of the RFID device 108. Alternatively, two separate receiving and transmitting antenna coils can be substituted for the single "dual function antenna coil" in the RFID device 108. The RFID device 108 may also optionally include an external transponder tuning capacitor coupled to the IC and to each antenna coil of the tag's antenna 116. Further details of the RFID device circuitry are described in U.S. patent application Ser. No. 10/874,542 to Lowe, the entire contents of which are hereby incorporated herein by reference.

The RFID device's antenna 116, in cooperation with the transponder tuning capacitor, if present, may be used to determine the carrier frequency of the RFID device 108. In accordance with at least some embodiments of the present invention, the RFID device 108 may be equipped to communicate at a number of different carrier frequencies including, without limitation, 125 kHz, 13.56 MHz, etc. Alternatively or additionally, the RFID device 108 may be configured to communicate via NFC and/or Bluetooth (e.g., Bluetooth 4).

The RFID device 108 shown and described herein is but one example of a type of transponder having utility in the RFID system 100. It is understood that practice of the present invention is not limited to any one specific type of tag, but is generally applicable to most conventional types of tag having utility in RFID systems. Thus, for example, the tag can be selected from proximity cards, proximity tags, smart cards, NFC devices, or the like. It is further understood that practice of the present invention is not limited to RFID systems having only one tag and one reader as shown and described, but is generally applicable to RFID systems having any number of compatible tags/machine readable credentials and readers.

Furthermore, the RFID device 108 may be provided in a number of different form factors. For example, the RFID device 108 may be provided on or within a card as described above. Additionally, the RFID device 108 may be provided on or within a key fob, portable electronic device (e.g., laptop, Personal Digital Assistant (PDA), portable e-mail retrieval device, cellular phone, etc.), any other device including a SIM card containing one of its ICs, a computer, a phone, or any other generally portable device.

In most conventional RFID systems, the position of the reader 104 is stationary (i.e., constant) relative to the surrounding environment, while the position of the RFID device 108 is portable (i.e., variable) within the surrounding environment. In such cases, the user of the RFID system moves the portable RFID device 108 into relative proximity with the stationary reader 104 to enable simultaneous operation of the both the RFID device 108 and reader 104. In some conventional RFID systems, however, the position of the reader 104 may be portable relative to the surrounding environment, while the position of the RFID device 108 is either portable or stationary. In the case of a portable reader 104 and a stationary RFID device 108, the user moves the portable reader 104 into relative proximity with the stationary RFID device 108 to enable simultaneous operation of the both the RFID device 108 and reader 104. In the case of a portable reader 104 and a portable RFID device 108, the user may move both the portable reader 104 and the portable RFID device 108 into relative proximity with one another to enable simultaneous operation of the both the RFID device 108 and reader 104. Embodiments of the present invention are not limited to any one of the above-recited RFID system configurations.

As can be seen in FIG. 2, the RFID device 108 may further include a directional sensing mechanism 208 that is coupled to a switch 212. The switch 212 may control the overall operational abilities of the RFID device 108. More specifically, the switch 212 may be enabled to disconnect the IC 204 of the RFID device 108 from the antenna 116. Alternatively, the switch 212 may be enabled to disconnect the IC 204 from an external memory that contains sensitive data. In yet another alternative embodiment, the switch 212 may be enabled to disable the antenna 116 entirely. In still another alternative embodiment, the switch 212 may be enabled to disable or otherwise directly control the operation of the IC 204 (i.e., the switch 212 may be integral to the IC 204). In other words, the switch 212 may comprise a logical switch that is simply a rule set implemented by the IC 204 when a particular signal is received at the IC 204 from the directional sensing mechanism 208.

As can be seen in FIG. 2, the IC 204, sensing mechanism 208, and/or switch 212 may be provided on a single piece of silicon 216 residing in the RFID device 108. Alternatively, just the IC 204 and sensing mechanism 208 may be provided on the single piece of silicon 216. Still further in the alternative, each component may be provided on separate pieces of silicon.

As a default state, the switch 212 may not allow the RFID device 108 to transmit any data (including sensitive data) from the antenna 116. When an "activating" predetermined motion or sequence of motions is detected at the sensing mechanism 208, the switch 212 may be moved from its default state and the RFID device 108 may then be allowed to transmit sensitive data.

Once the RFID device 108 is enabled to transmit data, the IC 204 may be enabled to retrieve sensitive data from its location of storage, generate a message containing said data, then transmit said message to the reader 104 via its antenna 116.

In accordance with at least some embodiments and as noted above, the present invention is not limited to use in RFID technologies or controlling such technologies. Rather, embodiments of the present invention may be applied to SIM cards containing one or more ICs or other ICs residing in a mobile communication device. A directional sensing mechanism 208 may be employed to control the operation of the SIM card or IC of the mobile communication device. As one example, the directional sensing mechanism 208 may be utilized to limit the operation of the SIM card or IC. As another example, the directional sensing mechanism 208 may be used to provide a control input to the SIM card or IC such that operations of the SIM card or IC are based on motions of the mobile communication device sensed by the directional sensing mechanism 208. This may allow a user of the mobile communication device to control the operation of the mobile communication device by simply shaking the mobile communication device or moving it in a predetermined fashion or according to a predetermined sequence of motions. A different set of motions or sequence of motions may be used as different control inputs to the SIM card or IC.

As one example, a rotation of the mobile device to the left may correspond to an input which causes the SIM card or IC to perform one action whereas a rotation of the mobile device to the right may correspond to a different input which causes the SIM card or IC to perform another different action.

As another example, a user may originate a call via the antenna 116 to a remote destination (e.g., via cellular communication technologies) and a predetermined phone number by simply shaking or tapping the mobile device. This allows the user control the operations of the mobile device and certain applications residing therein by simply moving or shaking the mobile device. This may allow the creation of a mobile communication device that does not necessarily need a handset or keypad. In other words, the SIM card of the mobile device may be handset independent and can simply be controlled by the shaking or tapping of the mobile device and subsequent detection of motion by the directional sensing mechanism 208.

Figure 3:
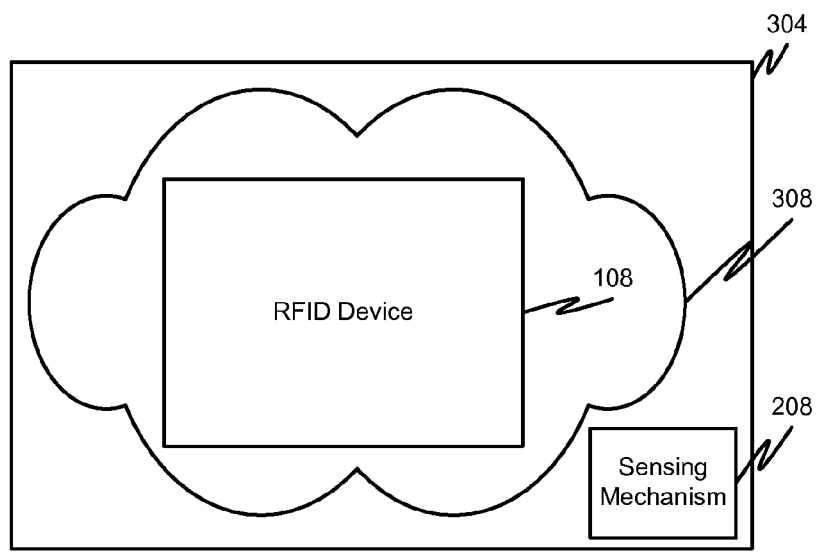
FIG. 3 is a block diagram depicting an alternative configuration of an RFID device holder in accordance with at least some embodiments of the present invention.
Figures 4, 5:
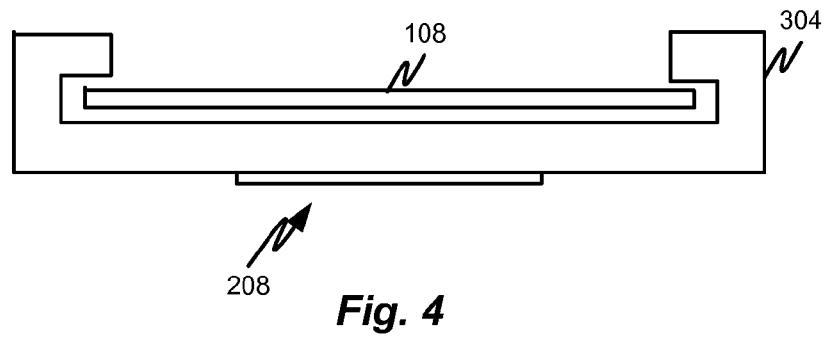
FIG. 4 is a block diagram depicting a cross-sectional view of an RFID device contained with a holder that actively cancels RF communications unless a predetermined motion or sequence of motions is detected by the holder in accordance with at least some embodiments of the present invention.
FIG. 5 is a table depicting exemplary motions and their associated actions in accordance with at least some embodiments of the present invention.

FIGS. 3 and 4 depict an alternative mechanism that may be used to protect sensitive data stored on an RFID device 108. More specifically, rather than "enabling" the RFID device 108 to transmit sensitive data only when a predetermined motion or sequence of motions is detected by a sensing mechanism 208, it may be possible to employ a card carrying device 304 that generates an active cancellation field 308 which is intended to distort any data transmission of the RFID device 108. More specifically, the holder 304 may comprise a separate antenna and IC that are adapted to be activated when carried into an RF field. If an RFID device 108 is also in the holder when an RF field is applied thereto, both the antennae in the holder and an antenna in the RFID device 108 will attempt to transmit messages. The signal transmitted by the holder 304 is used to create noise thereby making it difficult or impossible to retrieve the data transmitted by the RFID device 108. If a user desires to have their RFID device read by a reader, the user is traditionally required to remove the RFID device 108 from the holder 304 so that the cancellation field 308 is not generated.

Embodiments of the present invention propose incorporating a sensing mechanism 208 in the holder 304 rather than the RFID device 108 so that privacy protection techniques described herein can be used to protect data on older legacy RFID devices 108 that do not have a directional sensing mechanism 208. In accordance with at least some embodiments of the present invention, a user can allow data from the RFID device 108 to be read by moving the holder 304 in a predetermined motion or sequence of motions to temporarily deactivate the cancellation field 308. This allows the RFID device 108 to be the only antenna which responds to the reader. This can all be accomplished without requiring a user to remove the RFID device 108 from the holder 304.

As can be seen in FIG. 4, the holder 304 may have a preferred geometry for physically securing the RFID device 108. The directional sensing mechanism 208 may be provided on a printed circuit board or the like that resides on the back side of the card holder 304. The directional sensing mechanism 208 may operate in a normal fashion, but instead of enabling operations of the holder 304 when a predetermined motion or sequence of motions is detected, the directional sensing mechanism 208 may disable operations of the holder 304 for a predetermined amount of time.

With reference now to FIG. 5, an exemplary motion table 500 used to translate motions into actions will be described in accordance with at least some embodiments of the present invention. As can be seen, rotational movements across one, two, or three axes may be used to protect data on an RFID device 108 or at least control the operation of the RFID device 108. Additionally, sliding movements may also be considered as a motion input. When a predetermined motion or sequence of motions is detected, an action is performed in conformity with the actions listed in the table 500. As one example, the motion or sequence of motions may result in an action which allows the RFID device 108 to transmit sensitive data to a reader. As another example, the motion or sequence of motions may result in the generation and transmission of a predetermined message. As yet another example, the motion or sequence of motions may cause the IC 204 to translate the motions into binary data which can be transmitted as a password to the reader 104 alone or in addition to other sensitive data stored on the RFID device 108. The reader 104 can then analyze the password to determine if user access is permitted. The password may be used as a metaphor or substitution of a user input which would otherwise need to be provided to a keypad on the reader 104. Accordingly, a reader 104 without a keypad can test what the user is carrying as well as what the user knows, thereby resulting in a substantially more secure facility.

In accordance with at least some embodiments of the present invention an enrollment process is provided whereby a user is allowed to define their personal motion or sequence of motions that will be used to protect the data on the RFID device 108. In one embodiment, the user may be allowed to sit in front of a reader connected to a computer providing the user with a Graphical User Interface. The reader may prompt the user to enter their motion-based password and will then wait for the detection of a motion or series of motions. Once the user has performed the desired motion(s), the user may indicate that they are done and the reader/computer will replay the detected motion or sequence of motions and ask the user if that is their desired password. If the user selects yes, then the entries in the table 500 may be updated accordingly. Also, the password data may be provided back to the RFID device 108 or at least an affirmation is sent to the RFID device 108 indicating that the last motion or sequence of motions corresponds to a password entered and recognized by the reader.

In accordance with at least some alternative embodiments of the present invention, the motion-based password may also be used to protect non-RF devices. As an example, an RSA card may be secured with a directional sensing mechanism 208 performing operations as described herein. Unless a predetermined motion or sequence of motions is detected at the RSA card, then the RSA card may be prohibited from generating a code for the user.

Figure 6:
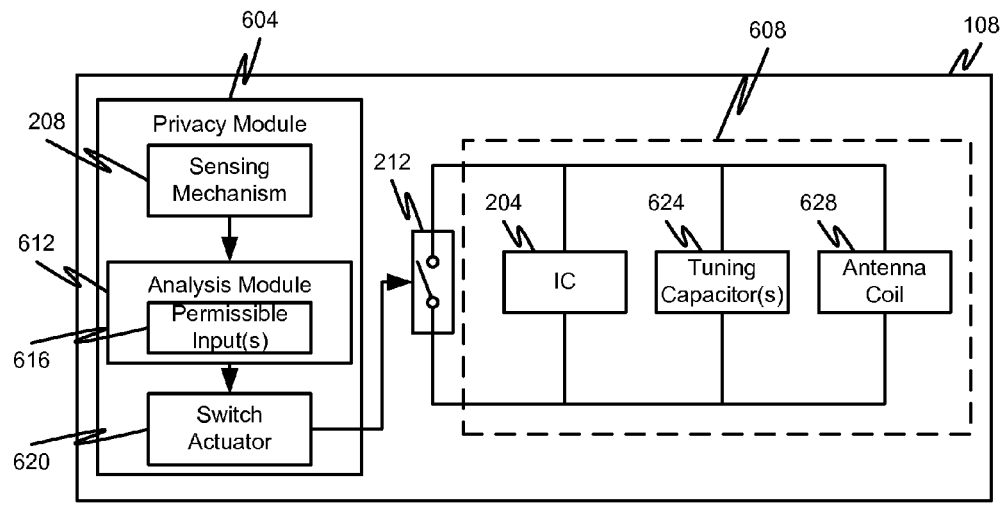
FIG. 6 is a block diagram depicting another illustrative RFID device in accordance with embodiments of the present disclosure.

With reference now to FIG. 6, an alternative configuration an RFID device 108 will be described in accordance with embodiments of the present disclosure. The RFID device is similar to the RFID device 108 of FIG. 2 in that a sensing mechanism 208 is used to actuate or control the operations of a switch 212 that effectively controls the RFID device's ability to establish RF communications with other devices. In particular, the RFID device 108 is shown to include a transponder module 608 and a privacy module 604.

In some embodiments, the privacy module 604 comprises the sensing mechanism 208, an analysis module 612, and a switch actuator 620. The transponder module 608 is shown to include an IC 204 (possibly having sensitive data), a tuning capacitor 624, and an antenna coil 628. The antenna coil 628 may be similar or identical to the antennas 116 previously discussed herein.

The transponder module 608 may behave and operate much like a traditional RF transponder (e.g., via inductive or RF coupling). The privacy module 604 may comprise any collection of software, firmware, microprocessors, or the like that are capable of detecting one or more predetermined motions at the sensing mechanism 208, analyzing the motions detected at the sensing mechanism with the analysis module 612, and depending upon the analysis of the motions, invoking the switch actuator 620. As a non-limiting example, the privacy module 604 may all be built on a single piece of silicon or the sensing mechanism 208 may be incorporated into a microprocessor that is also executing the analysis module 612. As another non-limiting example, the analysis module 612 may be software instructions executed by a microprocessor, firmware instructions, and/or a digital logic circuit (e.g., ASIC) that is configured to operate the switch actuator 620 only in response to receiving one or more permissible inputs 616 from the sensing mechanism 208.

The privacy module 604 is coupled to the transponder module 608 via the switch 212 (which may actually contain one or more switches). The switch 212 may be physically or mechanically operated by the switch actuator 620. When the switch 212 is in a first position (e.g., open or closed), the IC 204 may be configured to exchange RF communications with other RF-enabled devices via the antenna coil 628. When the switch 212 is in a second position (e.g., an opposite position to the first position), the IC 204 may effectively be prohibited from exchanging RF communications via the antenna coil 628. In some embodiments, an open position of the switch 212 may enable the IC 204 to establish communications via the antenna coil 624 whereas a closed position of the switch 212 may effectively short the antenna 628, thereby prohibiting the IC 204 from establishing RF communications via the antenna coil 624. Because the privacy module 604 is enabled to control the switch 212 via the switch actuator 620, the privacy module 604 may be configured to effectively interrupt, short, or otherwise interfere with the operations of the transponder module 608. Accordingly, unless an appropriate permissible input 616 is received at the sensing mechanism 208 and recognized by the analysis module 612, the transponder module 608 may be prohibited from exchanging RF communications. Said another way, credentials or other sensitive information stored on the IC 204 may only be released when the permissible input(s) 616 are received at the sensing mechanism 208 (e.g., when predetermined directional motions of the RFID device 108 occur).

In some embodiments, the switch 212 can be incorporated into the transponder module 608 and/or the privacy module 604. In some embodiments, the switch actuator 620 may be incorporated into the transponder module 608 instead of the privacy module 604.

Figure 7:
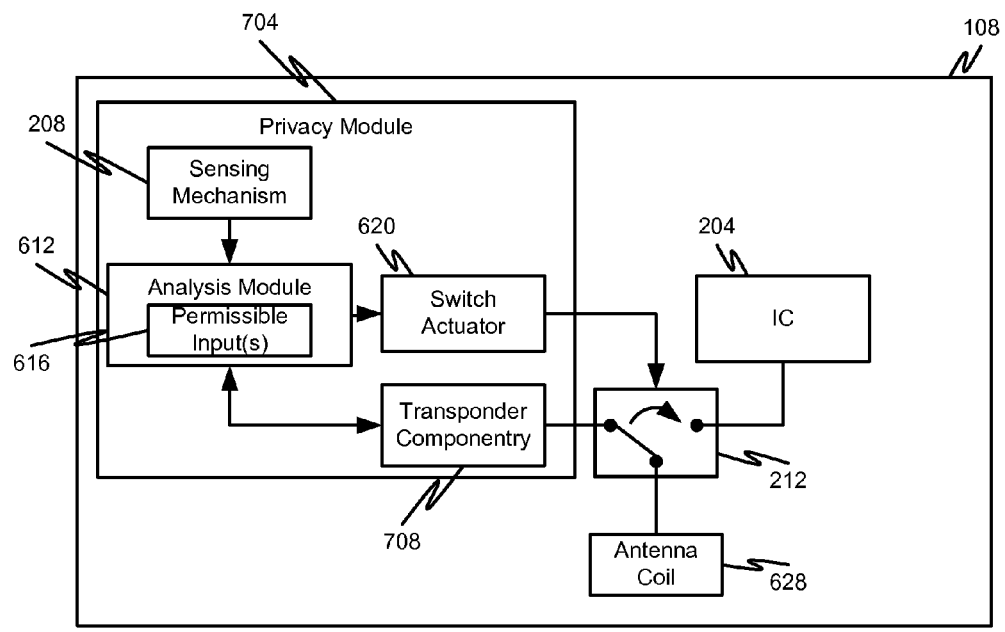
FIG. 7 is a block diagram depicting another illustrative RFID device in accordance with embodiments of the present disclosure.

FIG. 7 depicts yet another example of an RFID device 108 whereby a privacy module 704 is provided with transponder componentry 708. The privacy module 704 may be similar or identical to the privacy module 604, except that the privacy module 704 is inherently capable of RF communications.

The transponder componentry 708 may enable the privacy module 704 to exchange RF communications much like a traditional RF transponder (e.g., transponder module 608). In some embodiments, the privacy module 704 may be powered from an RF field generated by an external RFID reader (e.g., via inductive coupling). The power received from the RFID reader may be provided from the transponder componentry 708 to other components of the privacy module 704, thereby activating the privacy module 704. Once the transponder componentry 708 is activated (e.g., vis-à-vis inductive coupling with an RF interrogation circuit as defined in one or more of ISO 14443, the entire contents of which are hereby incorporated herein by reference), the sensing mechanism 208 may be activated and enabled to detect motions of the RFID device 108. Likewise, once the transponder componentry 708 is activated, the analysis module 612 may be activated and enabled to analyze motion inputs received at the sensing mechanism 208. Advantageously, this enables the analysis module 612 to be programmed with new permissible inputs 616 without requiring the IC 204 to be connected to the antenna coil 628 or otherwise be activated. In other words, the privacy module 704 may comprise the ability to be powered from an external RF field and then may utilize a microprocessor and non-volatile memory as part of the transponder componentry 708 so that the analysis module 712 can communicate with an external device (e.g., via RF, Bluetooth, NFC, etc.). This enables the analysis module 712 to receive programming instructions (e.g., in the form of motions to be programmed as permissible inputs 616). In other words, the analysis module 612 may be configured to execute an enrollment or provisioning mode of operation without exposing the IC 204 and the information contained therein.

The antenna 628, in some embodiments, may be required to be connected by the switch 212 to either the IC 204 or the privacy module 704. Both the privacy module 704 and the IC 204 may have a common ground and just the positive power connection is switched (e.g., SPST switch) or a DPST switch is used which connects both power and ground to either.

Initially, the antenna coil 628 may be connected to the privacy module 704 and then, if authorized by such, then the switch 212 connects the antenna 628 to the IC 204. This way the RF Field provided by a reader powers the privacy module 704 and then, when it is connected to the IC 204, the power is directed to the IC 204 and its RFID transponder componentry which behaves as if just entered the field.

In another embodiment, there could be separate antennas for both the privacy module 704 and the IC 204 and the control of the IC 204 is executed by various methods including shorting the antenna 628 or otherwise preventing the IC 204 from receiving power or even a logic signal that is connected to an inhibit function of the RFID transponder or even a communications connection between each other.

In some embodiments, the IC 204 could be incorporated in to the privacy module 704 and upon successful authentication (e.g., detection of appropriate directional inputs), the IC 204 emulate an RFID transponder. In this case, the switch 212 may not be an electronic component but a logical software function switch.

In one embodiment, the entire assembly depicted in FIG. 7 may be contained on a very thin PCB with either an etched antenna 628 or conventional antenna coil 628 attached to such PCB. Alternatively or additionally, the antenna 628 can be contained on a PCB with external connection points for a separate antenna that is affixed to such. In either case, the PCB assembly can be constructed in such a way that it can be placed inside an injection-molded conventional clamshell RFID card that is of typical size and thickness to what is typically used in RFID cards such that there is no visual difference to the user. Additionally or alternatively, the antenna 628 and switch 212 could be laminated into a card by heat or glue or otherwise such that the final assembly again has the same or similar dimensions of RFID cards as already used. Of course these assembly techniques are not just limited to cards and could be in the form factor of key-fobs, stickers to be affixed to devices, or otherwise.

The enrollment of the desired sequences can be collected on an external device and programmed into the directional sensing mechanism using RFID or even a wired connection during the manufacturing process or by electrical contacts on the card itself, similar to the contacts of a contact smart card. Additionally or alternatively, there could be an enrollment process using the assembly itself which is initiated by a pre-defined motion, push button, or otherwise. Furthermore, the functionality could employ LED's, audible mechanisms, displays, etc. to provide user feedback that a successful motion sequence has occurred and also for feedback during enrollment of the desired sequences to allow the RFID data to occur.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of controlling the operation of an electronic device equipped with an accelerometer, the method comprising:
    receiving an indication of a first movement of the electronic device in a first predetermined manner;
    receiving an indication of a second movement of the electronic device in a second predetermined manner, wherein the second movement of the electronic device occurs after the first movement of the electronic device;
    determining that the first movement and second movement correspond to a predetermined sequence of movements;
    generating a message at the electronic device in response to determining that the first movement and the second movement correspond to a predetermined sequence of movements; and
    sending the message to a second device,
    wherein the second device is a stationary reader configured to control access to a protected facility, and wherein the message transmitted to the second device comprises sensitive data stored in a memory of the electronic device, the sensitive data including at least one of a bank account number, a social security number, a PIN code, an RFID unique ID, and an encryption scheme, and
    further wherein the message transmitted to the second device comprises access control information stored in the memory of the electronic device and information regarding the first movement and the second movement, such that the second device can analyze the access control information and the first movement and the second movement in connection with making an access control decision for the electronic device.

2. The method of claim 1, wherein the message is transmitted to the reader via a Radio Frequency (RF) inductive coupling established between the reader and the electronic device.

3. The method of claim 1, wherein the message is transmitted to the reader via at least one of an audio and an optical channel.

4. The method of claim 1, wherein the message is transmitted using a Bluetooth protocol.

5. The method of claim 1, wherein the message is transmitted using a Near-Field Communications (NFC) protocol.

6. The method of claim 1, wherein the method further comprises:
    in response to determining that the first movement and the second movement correspond to a predetermined sequence of movements, providing an indication via the electronic device.

7. The method of claim 6, wherein the indication comprises a visual indication of a lock metaphor.

8. The method of claim 6, wherein the indication comprises a visual indication that the first movement and the second movement together represent at least a part of a password.

9. The method of claim 6, wherein the indication comprises a vibratory feedback.

10. The method of claim 6, wherein the indication comprises an audible feedback.

11. A communication system, comprising:
    a portable electronic device comprising a directional sensing mechanism; and
    a second electronic device configured to control access to a protected resource and further configured to exchange wireless communications with the portable electronic device via a proximity-based Radio Frequency (RF) communication protocol, wherein the portable electronic device transmits one or more messages to the second electronic device in response to the directional sensing mechanism receiving a predetermined sequence of motion-based inputs as a result of a user moving the portable electronic device, the one or more messages comprising sensitive data stored on the portable electronic device and released in response to the portable electronic device detecting the predetermined sequence of motion-based inputs and correlating the predetermined sequence of motion-based inputs to a motion-based password, the sensitive data including at least one of a bank account number, a social security number, a PIN code, a password, a key, an RFID unique ID, and an encryption scheme, wherein the motion-based password was input during an enrollment process.

12. The communication system of claim 11, wherein the proximity-based RF communication protocol comprises a Bluetooth protocol.

13. The communication system of claim 11, wherein the proximity-based RF communication protocol comprises a Near-Field Communications (NFC) protocol.

14. The communication system of claim 11, wherein the enrollment process was performed with the portable electronic device.

15. The communication system of claim 11, wherein the second electronic device comprises a stationary reader.

16. A physical access control system, comprising:
a stationary reader configured to control access to a protected facility; and
a portable electronic device comprising an Integrated Circuit and sensitive data stored thereby, wherein the portable electronic device is configured to communicate with the reader via a proximity-based Radio Frequency (RF) protocol, wherein the portable electronic device is further configured to detect and analyze a sequence of motion-based inputs based on movement of the portable electronic device and, if the sequence of motion-based inputs correspond to a password or a preprogrammed sequence of motion-based inputs stored by the portable electronic device, transmit the sensitive data to the reader via the proximity-based RF protocol,
wherein the sensitive data includes an RFID unique ID and further wherein the password or the preprogrammed sequence of motion-based inputs was programmed in firmware during a manufacturing process.

17. The physical access control system of claim 16, wherein the portable electronic device comprises a mobile communication device.

18. The physical access control system of claim 17, wherein the proximity-based RF protocol comprises a Bluetooth protocol.

19. The physical access control system of claim 17, wherein the proximity-based RF protocol comprises a Near-Field Communications (NFC) protocol.

20. The physical access control system of claim 16, wherein the password includes a plurality of motion-based inputs and wherein the sensitive data comprises an access credential.

21. The physical access control system of claim 16, wherein the sequence of motion-based inputs includes a three-dimensional set of inputs.

* * * * *